US008663846B2

(12) United States Patent  
Choi et al.

(10) Patent No.: US 8,663,846 B2  
(45) Date of Patent: *Mar. 4, 2014

(54) CATHODE ACTIVE MATERIAL, METHOD OF PREPARING THE SAME, AND CATHODE AND LITHIUM BATTERY CONTAINING THE MATERIAL

(75) Inventors: Young-min Choi, Osan-si (KR); Kyung-ho Kim, Cheonan-si (KR); Gue-sung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 216 days.

This patent is subject to a terminal disclaimer.

(21) Appl. No.: 12/568,510

(22) Filed: Sep. 28, 2009

(65) Prior Publication Data

US 2010/0019208 A1    Jan. 28, 2010

Related U.S. Application Data

(63) Continuation of application No. 11/355,381, filed on Feb. 15, 2006, now Pat. No. 7,608,362.

(30) Foreign Application Priority Data

Feb. 15, 2005    (KR) .................. 10-2005-0012384

(51) Int. Cl.  
*H01M 4/13*    (2010.01)

(52) U.S. Cl.  
USPC .............. 429/231.1; 429/231.2; 429/231.3; 429/231.5; 429/231.6; 429/231.8; 429/221; 429/223; 429/224; 252/182.1

(58) Field of Classification Search  
USPC .......... 429/231.1, 231.2, 231.3, 231.5, 231.6, 429/231.8, 221, 223, 224; 252/182.1; 977/742  
See application file for complete search history.

(56) References Cited

U.S. PATENT DOCUMENTS 7,608,362 B2 *  10/2009  Choi et al. ................ 429/231.1  
2005/0220700 A1  10/2005  Suhara et al.

FOREIGN PATENT DOCUMENTS

| JP | 2000-82466 | 3/2000 |
| JP | 2002-093417 | 3/2002 |
| JP | 2002-216756 | 8/2002 |
| JP | 2002-279984 | 9/2002 |
| JP | 2002-319398 | * 10/2002 |
| JP | 2002-343354 | 11/2002 |
| JP | 2003-257416 | 9/2003 |
| JP | 2004-119218 | 4/2004 |
| JP | 2004-220897 | 8/2004 |
| KR | 10-2004-0026378 | 3/2004 |
| WO | WO 2004/082046 A1 | 9/2004 |

OTHER PUBLICATIONS

Korean Patent Abstract; Laid-open No. 2004-0026378; Laid-open Date Mar. 31, 2004; in the name of Pak, et al.  
Korean Office action dated Apr. 25, 2006 for corresponding Korean Patent application 10-2005-0012384 with English Translation.

(Continued)

*Primary Examiner* — Laura Weiner  
(74) *Attorney, Agent, or Firm* — Christie, Parker & Hale, LLP

(57) ABSTRACT

Composite cathode active materials having a large diameter active material and a small diameter active material are provided. The ratio of the average particle diameter of the large diameter active material to the average particle diameter of the small diameter active material ranges from about 6:1 to about 100:1. Mixing the large and small diameter active materials in a proper weight ratio improves packing density Additionally, including highly stable materials and highly conductive materials in the composite cathode active materials improves volume density, discharge capacity and high rate discharge capacity.

11 Claims, 4 Drawing Sheets

(56) References Cited

OTHER PUBLICATIONS

Patent Abstracts of Japan, Publication No. 2002-319398, dated Oct. 31, 2002, in the name of Sho Ichiro Watanabe et al.
Chinese Office action dated Dec. 21, 2007, for corresponding Chinese application 2006100044217 with English translation indicating relevance of cited reference JP 2002-319398.
Japanese Office action dated Aug. 25, 2010, for corresponding Japanese Patent application 2006-037078.
Japanese Office action dated Sep. 7, 2010, for corresponding Japanese Patent application 2006-037078, as well as JP 2002-319398.
SIPO Notification of Final Rejection dated Dec. 22, 2011, for correspondin Chinese Patent application 201110073284.3, with English translation, 11 pages.
SIPO Decision of Reexamination dated Dec. 27, 2010, for corresponding Chinese Patent application 200610004421.7, with English translation.
SIPO Office action dated May 30, 2012, for corresponding Chinese Patent application 201110073284.3, with English translation, (12 pages).
SIPO Office action dated Aug. 10, 2010, for corresponding Chinese Patent application 200610004421.7, with English translation, noting Japanese reference JP 2002-319398.
SIPO Notice of Reexamination dated Aug. 7, 2013, with English translation, for corresponding Chinese Patent application 201110073284.3, (14 pages).

* cited by examiner

CATHODE ACTIVE MATERIAL, METHOD OF PREPARING THE SAME, AND CATHODE AND LITHIUM BATTERY CONTAINING THE MATERIAL

CROSS-REFERENCE TO RELATED PATENT APPLICATION

This application is a continuation of U.S. patent application Ser. No. 11/355,381 (now U.S. Pat. No. 7,608,362), filed Feb. 15, 2006, which claims priority to and the benefit of Korean Patent Application No. 10-2005-0012384, filed on Feb. 15, 2005 in the Korean Intellectual Property Office, the entire content of both of which is incorporated herein by reference.

FIELD OF THE INVENTION

The present invention relates to cathode active materials, a method of preparing the same, and a cathode and lithium battery containing the cathode active materials. More specifically, the present invention relates to cathode active materials having high volume densities, and to cathodes and lithium batteries having high voltage stability, thermal stability and high rate discharge characteristics.

BACKGROUND OF THE INVENTION

Lithium secondary batteries have high voltage and high capacity compared to conventional nickel cadmium secondary batteries and the like. Specifically, when lithium transition metal composite oxides, such as $LiCoO_2$, $LiNiO_2$ and $LiMn_2O_4$ are used as the cathode active material, and carbonaceous materials, such as graphite, carbon fiber and the like are used as the anode active material, high voltage and high capacity of 4V or greater can be achieved. Because lithium secondary batteries have few adverse effects such as short circuits, they have been widely used as power sources for mobile electronic devices such as cell phones, notebook computers, digital cameras and the like.

However, mobile devices are rapidly becoming lighter and smaller, and are being used for a variety of functions. Since mobile devices can be used in both low and high temperatures, higher electric capacities, higher charge/discharge characteristics and greater stability are needed. Conventional lithium batteries using $LiCoO_2$ powder as cathode active materials do not exhibit these battery characteristics. Accordingly, various alternatives have been presented to achieve these characteristics.

For example, methods for coating cathode active materials have been proposed. However, complex processes make these methods difficult to apply.

Methods for improving the packing densities of the active material particles have also been proposed. However, improvements in the desired battery characteristics, such as high voltage stability, thermal stability and high rate discharge characteristics, are limited.

Accordingly, a need exists for composite cathode active materials capable of improving high voltage stability, thermal stability and high rate discharge characteristics of lithium batteries.

SUMMARY OF THE INVENTION

In one embodiment of the present invention, composite cathode active materials impart improved high voltage stability, thermal stability and high rate discharge characteristics.

In another embodiment of the present invention, a cathode and a lithium battery comprising the composite cathode active material are provided.

According to one embodiment of the present invention, a composite cathode active material includes at least one large diameter active material selected from the group consisting of compounds represented by formulas 1 and 2, and at least one small diameter active material selected from the group consisting of carbon-based materials and compounds represented by formulas 2, 3, 4. The ratio of the average diameter D50 of the large diameter active material to the average diameter of the small diameter active material ranges from about 6:1 to about 100:1.

$$Li_xCO_{1-y}M_yO_{2-\alpha}X_\alpha \quad \text{Formula 1}$$

$$Li_xCO_{1-y-z}Ni_yM_zO_{2-\alpha}X_\alpha \quad \text{Formula 2}$$

$$Li_xMn_{2-y}M_yO_{4-\alpha}X_\alpha \quad \text{Formula 3}$$

$$Li_xCO_{2-y}M_yO_{4-\alpha}X_\alpha \quad \text{Formula 4}$$

In Formulas 1 through 4, $0.90 \leq x \leq 1.1$, $0 \leq y \leq 0.9$, $0 \leq z \leq 0.5$, $0 \leq \alpha \leq 2$, M is selected from the group consisting of Al, Ni, Mn, Cr, Fe, Mg, Sr, V, rare earth elements and mixtures thereof, and X is selected from the group consisting of O, F, S and P.

In one embodiment, the ratio of the average diameter D50 of the large diameter active material to the average diameter of the small diameter active material ranges from about 6:1 to about 20:1.

The weight ratio of the large diameter active material to the small diameter active material may range from about 60:40 to about 90:10. In another embodiment, the weight ratio of the large diameter active material to the small diameter active material ranges from about 70:30 to about 80:20.

The mole ratio of the large diameter active material to the small diameter active material may range from about $60/M_{w1}$:$40/M_{w2}$ to about $90/M_{w1}$:$10/M_{w2}$, in which $M_{w1}$ is the molecular weight of the large diameter active material, $M_{w2}$ is the molecular weight of the small diameter active material, and each of w1 and w2 is an integer other than 0. In another embodiment, the mole ratio of the large diameter active material to the small diameter active material ranges from about $70/M_{w1}$:$30/M_{w2}$ to about $80/M_{w1}$:$20/M_{w2}$, in which $M_{w1}$ is the molecular weight of the large diameter active material, $M_{w2}$ is the molecular weight of the small diameter active material, and each of w1 and w2 is an integer other than 0.

The carbon-based material may be selected from the group consisting of graphite, hard carbon, carbon black, carbon fiber, carbon nanotubes (CNT) and mixtures thereof.

The large diameter active materials may have a pressed density ranging from about 2.5 to about 4.0 $g/cm^3$, and the small diameter active material may have a pressed density ranging from about 1.0 to about 4.0 $g/cm^3$.

The average particle diameter D50 of the large diameter active material may range from about 1 to about 25 μm.

The average particle diameter D50 of the small diameter active material may range from about 0.05 to about 5 μm.

According to another embodiment of the present invention, a cathode comprises the composite cathode active materials. In yet another embodiment, a lithium battery includes the cathode.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

The present invention will now be described with reference to the accompanying drawings, in which exemplary embodiments of the invention are shown. However, it is understood that the described embodiments are illustrative in nature and that the present invention is not limited to the illustrated embodiments. Throughout the specification, like numbers refer to like elements.

In one embodiment of the present invention, composite cathode active materials comprise large diameter cathode active materials and small diameter cathode active materials. In particular, the large and small diameter cathode active materials are provided in a certain particle diameter ratio and a certain weight ratio, and the composite cathode active materials have improved volume densities relative to conventional cathode active materials. Highly stable and highly conductive materials are used as the small diameter active materials, making it possible to produce cathodes and lithium batteries having high voltage stability, thermal stability, high rate discharge characteristics, and the like.

One way to improve the electric capacity of a cathode for a lithium battery is to optimize the distribution of homo-type powders or hetero-type powders. For example, when homogeneous powders are packed, uniform voids are created among the particles. Accordingly, when using hard spherical particles, the packing ratio theoretically can not exceed 64% regardless of packing density and the volume density can not exceed 3.2 g/cm$^3$. As a result, optimization is restricted. Accordingly, to pack particles more densely, two kinds of particles having different particle diameters can be used such that the spaces between the large diameter particles are filled with the small diameter particles. Here, the size ratio of the particles becomes important.

Fractional densities were calculated based on the ratio of particle sizes of the particles having different average particle diameters. In making these calculations, the particles were assumed to be hard spherical isotropic particles whose shape does not alter upon packing. The calculation (simulation) was performed using common methods known in the art. The results of the calculation are shown in FIG. 1.

Figure 1:
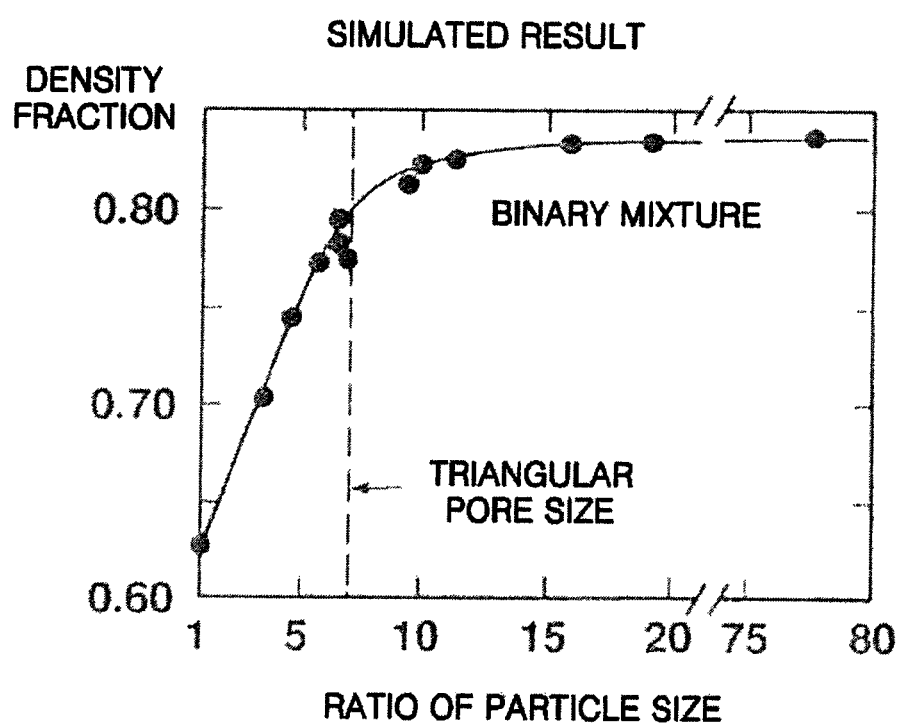
FIG. 1 is a simulated graph of the fractional density versus the average particle size ratio of cathode active materials having two different average particle sizes according to one embodiment of the present invention.

As shown in FIG. 1, when the ratio of particle sizes was 1, the fractional density was approximately 0.6. However, as the ratio of particle sizes increased, the fractional density also increased and reached about 0.8. When the ratio of particle sizes reached 7 and greater, a pattern appeared in which the fractional density converged near a value of about 0.85. When the ratio of particle sizes reaches 7, a triangular pore is created among three large diameter particles, which pore can be filled with one small diameter particle. Accordingly, when the ratio of particle sizes is 7 or greater, the space created between the large diameter particles can be filled with small diameter particles to effectively use the space and obtain excellent fractional densities.

According to one embodiment of the present invention, the large diameter active material is selected from the group consisting of compounds of Formulas 1 and 2, and the small diameter active material is selected from the group consisting of carbon-based materials and compounds of Formulas 2, 3 and 4.

The ratio of the average diameter D50 of the large diameter active material to the average diameter of the small diameter active material ranges from about 6:1 to about 100:1. In another embodiment, the ratio of the average particle diameter D50 of the large diameter active material to the average particle diameter of the small diameter active material ranges from about 6:1 to about 50:1. In yet another embodiment, the ratio of the average particle diameter D50 of the large diameter active material to the average particle diameter of the small diameter active material ranges from about 6:1 to about 20:1. In still another embodiment, the ratio of the average particle diameter D50 of the large diameter active material to the average particle diameter of the small diameter active material ranges from about 7:1 to about 20:1.

$$Li_xCO_{1-y}M_yO_{2-\alpha}X_\alpha \qquad \text{Formula 1}$$

$$Li_xCO_{1-y-z}Ni_yM_zO_{2-\alpha}X_\alpha \qquad \text{Formula 2}$$

$$Li_xMn_{2-y}M_yO_{4-\alpha}X_\alpha \qquad \text{Formula 3}$$

$$Li_xCO_{2-y}M_yO_{4-\alpha}X_\alpha \qquad \text{Formula 4}$$

In Formulas 1 through 4, $0.90 \leq x \leq 1.1$, $0 \leq y \leq 0.9$, $0 \leq z \leq 0.5$, $0 \leq \alpha \leq 2$, M is selected from the group consisting of Al, Ni, Mn, Cr, Fe, Mg, Sr, V, rare earth elements and mixtures thereof, and X is selected from the group consisting of O, F, S and P.

The compounds represented by Formulas 1, 2, 3 and 4 and the carbon based materials will be described in more detail below.

Figure 2:
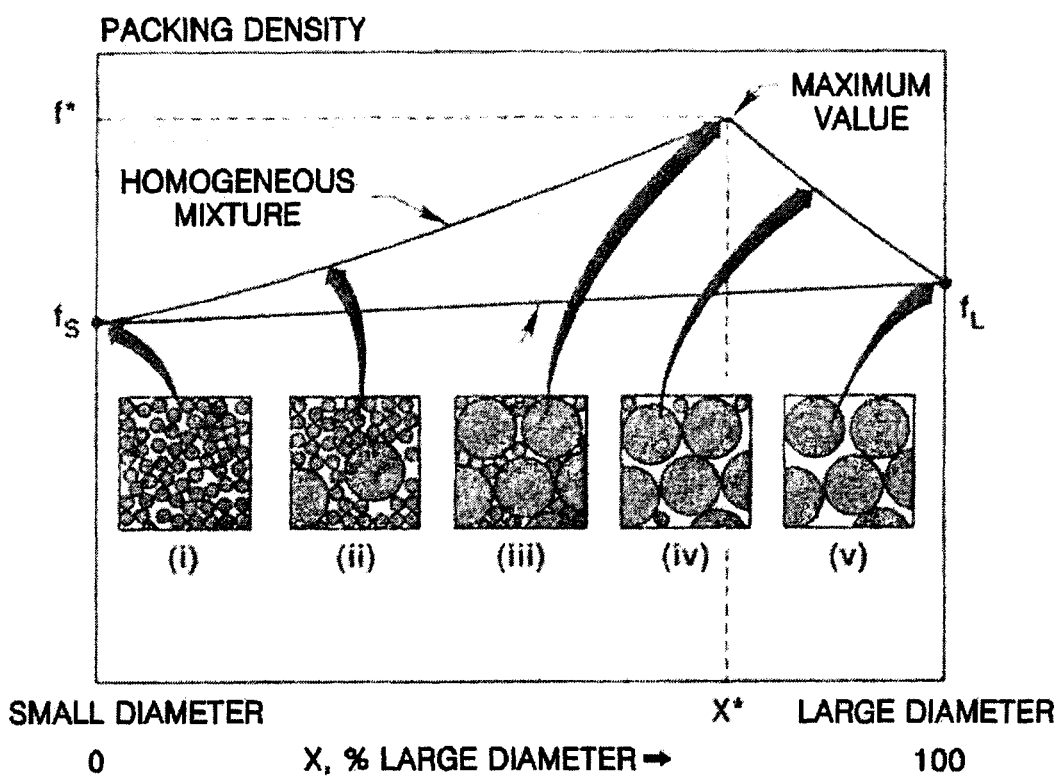
FIG. 2 is a graph approximating changes in packing density effected by the mixing ratio of particles having two different average particle sizes according to one embodiment of the present invention.

To fill the spaces between the large diameter active materials, the ratio of the average particle diameter of the active materials having different average particle diameters is important. However, to increase the final packing ratio, the weight ratio of the particles is also important. As shown in FIG. 2, when two types of particles having different particle diameters are mixed, a certain weight ratio will exhibit the highest packing density. Specifically, allowing the voids between the large diameter particles to be filled with the small diameter particles requires mixing the particles in a suitable weight ratio. According to one embodiment of the present invention, when two materials having different particle diameters are used, the ratio of particle diameters is 7:1, and the weight ratio is 73:27, the theoretical maximum packing fraction is about 0.86. However, when only one type of particle is used, the theoretical maximum packing fraction is 0.64. Accordingly, in addition to the ratio of average particle diameters D50 of the large to the small diameter active materials ranging from about 7:1 to about 100:1, the weight ratio of the large to the small diameter active materials ranges from about 60:40 to about 90:10. In another embodiment, the weight ratio of the large to the small diameter active materials ranges from about 70:30 to about 80:20. The mole ratio of the large diameter active materials to the small diameter active materials may range from about $60/M_{w1}:40/M_{w2}$ to about $90/M_{w1}:10/M_{w2}$. In another embodiment, the mole ratio ranges from about $70/M_{w1}:30/M_{w2}$ to about $80/M_{w1}:20/M_{w2}$. $M_{w1}$ is the molecular weight of the large diameter active material, $M_{w2}$ is the molecular weight of the small diameter active material, and each of w1 and w2 is an integer other than 0. When the mole ratio is outside this range, it is difficult to achieve improved battery characteristics due to a reduction in packing density.

In yet another embodiment of the present invention, three types of particles are used in the composite cathode active materials. When supplied in an appropriate ratio of average particle diameter and an appropriate weight ratio, the three particle composite cathode active material can have improved volume density. For example, when using three types of particles, the ratio of average particle diameters may be 49:7:1, and the weight ratio among the particles may be 75:14:11. When three types of particles are provided with these ratios, the theoretical maximum packing fraction is 0.95.

In another embodiment, four types of particles may be used. When four types of particles are used, the ratio of average particle diameters may be 343:49:7:1 and the weight ratio among the particles may be 73:14:10:3. When four types of particles are provided with these ratios, the theoretical maximum packing fraction is 0.98. Therefore, to additionally increase volume density, three or more types of cathode active materials are mixed, and the materials have ratios of average particle diameters and weight ratios within the ranges described above.

As described above, the cathode active materials of the present invention comprising at least two materials having different particle diameters have improved volume densities. By providing the two materials having different particle diameters in a certain ratio of particle diameters and a certain weight ratio, increased electric capacity can also be achieved. However, when highly stable materials and highly conductive materials are used as the small diameter material of the composite cathode active materials, increased thermal stability and high rate discharge characteristics may also be achieved. As a result, batteries having both improved volume capacities and improved charge/discharge characteristics can be obtained.

To improve the electric capacity of a cathode, cathode active materials with high capacity are used. Such materials can include compounds represented by Formulas 1 and 2, described above. Nonlimiting examples of suitable materials include $LiNi_{0.8}CO_{0.1}Mn_{0.1}O_2$, $LiNiO_2$, $LiNi_{0.9}Co_{0.1}O_2$, $LiNi_{0.8}Co_{0.1}Al_{0.1}O_2$ and the like. In addition, any known compounds having high capacity may be used.

As the small diameter cathode active material, compounds represented by Formulas 2, 3 and 4, and compounds that are structurally and thermally stable relative to lithium metal under high voltages of 4.2V or greater or compounds that can obtain such structural and thermal stability by surface treatment may be used. When using such compounds, the battery can be charged with high potential, thereby increasing discharge capacities. Such a battery, having high capacity and which is thermally stable, has reduced volume changes due to thermal expansion during charge/discharge cycles and exhibits improved overall battery performance.

Nonlimiting examples of suitable compounds represented by formulas 2, 3 and 4 include $LiNi_{1/3}Co_{1/3}Mn_{1/3}O_2$, $LiMn_2O_4$, $LiNi_{0.5}Mn_{0.5}O_2$, $LiCo_{0.95}Mg_{0.05}O_2$ and $LiNi_{1/2}Mn_{3/2}O_4$ and the like. In addition, any known compounds having structural and thermal stability can be used.

Further, carbon based materials having excellent conductivity can be used as the small diameter cathode active materials. When these compounds are used, large amounts of electrons can be occluded and discharged immediately. Because these compounds inherently have low resistance, the movement of electrons occurs reversibly and significant voltage changes do not occur even when applying high rate discharge currents. Accordingly, these compounds can be used as safe driving power sources and can be used in various operating environments.

Nonlimiting examples of suitable carbon based materials include graphite, hard carbon, carbon black, carbon fiber, carbon nanotubes (CNT) and the like. In addition, any known compounds having excellent conductivities can be used.

The pressed density of the large diameter active materials ranges from about 2.5 to about 4.0 $g/cm^3$, and the pressed density of the small diameter active materials ranges from about 1.0 to about 4.0 $g/cm^3$. Pressed density refer to an external pressed density determined by compressing particles at a pressure of 0.3 $t/cm^3$. If the pressed density of the large diameter particles is less than about 2.5 $g/cm^3$ and the pressed density of the small diameter particles less than about 1.0 $g/cm^3$, the pressed density of the mixture decreases. If the pressed density of the large diameter particles and the small diameter particles is greater than about 4.0 $g/cm^3$, high rate discharge characteristics deteriorate.

The pressed density of the composite cathode active materials may range from about 3.2 to about 4.0 $g/cm^3$ when pressed at a pressure of about 0.3 $t/cm^3$, and the pressed density will depend on the types and densities of the electrode plates being pressed with the active materials. If the pressed density of the composite active material is less than about 3.2 $g/cm^3$, it is difficult to obtain high battery capacity. If the pressed density is greater than 4.0 $g/cm^3$, the resulting density is too high and the particles of the active materials are crushed.

The average particle diameter D50 of the large diameter active materials may range from about 1 to about 25 μm. If the average particle diameter D50 is less than about 1 μm, dispersion of the particles and shaping of the electrodes becomes difficult. If the average particle diameter D50 is greater than about 25 μm, internal resistance increases.

Further, the average particle diameter D50 of the small diameter active materials may range from about 0.05 to about 5 μm. If the average particle diameter D50 of the small diameter active material is less than about 0.05 μm, dispersion of the particles and shaping of the electrodes becomes difficult. If the average particle diameter D50 is greater than about 5 μm, internal resistance increases.

In another embodiment of the present invention, a cathode is provided comprising the composite cathode active material described above. The cathode is manufactured by mixing the composite cathode active materials with a binder, shaping the mixture, and applying the shaped mixture to a current collector such as aluminum foil or the like.

More specifically, a cathode plate is manufactured by preparing a cathode active material composition and directly coating the composition on aluminum foil. Alternatively, the composition may be cast on a separate support to form a film, and then laminating the film on the aluminum foil. The cathode may also be manufactured into any other known shape.

Batteries having high capacities must be able to charge/discharge large amounts of current. To accomplish this, electrode materials having low electric resistance are used. These electrode materials can include conductive materials such as carbon black and graphite micro-particles, which decrease electrode resistance.

Figure 4:
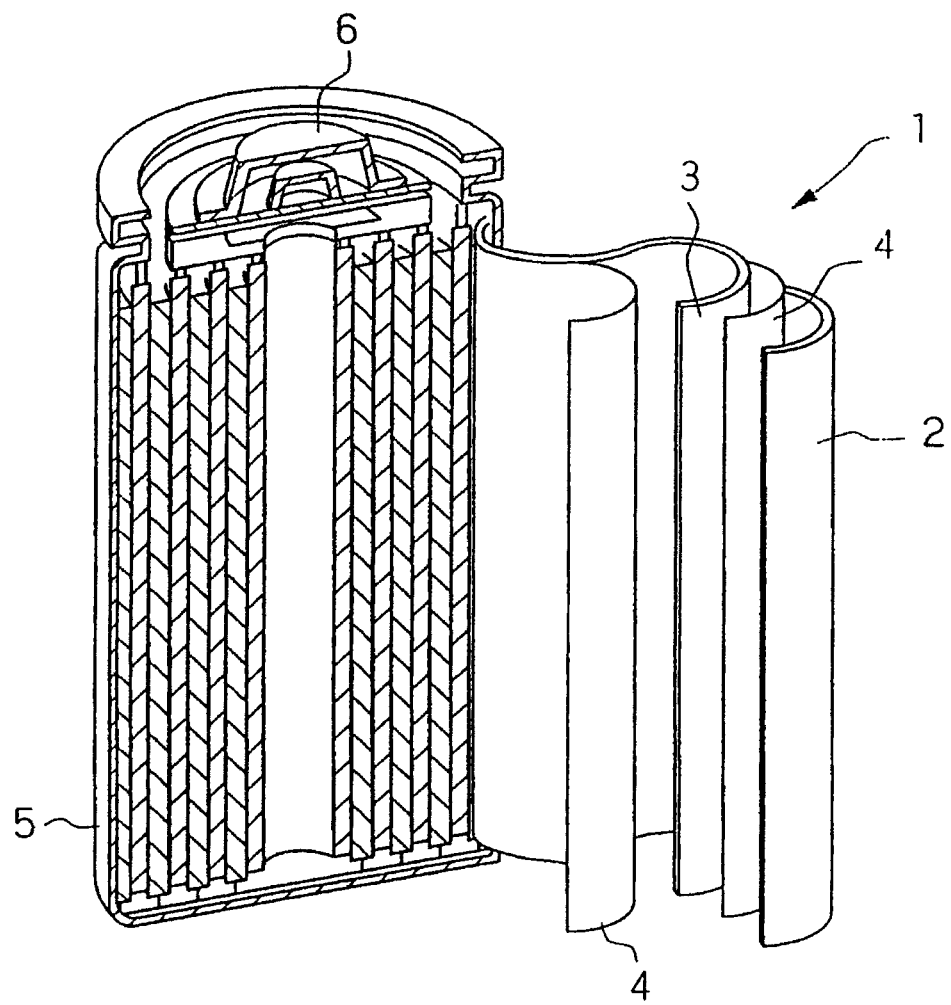
FIG. 4 is a schematic of a lithium battery according to one embodiment of the present invention.

In another embodiment of the present invention, a lithium battery comprises the above described cathode. As shown in FIG. 4, the lithium battery 1 comprises an anode 2, a cathode 3 and a separator 4 positioned between the anode 2 and cathode 3. The anode 2, cathode 3 and separator 4 are wound together to form and electrode assembly which is enclosed within a battery case 5, which is then sealed with a cap assembly 6.

The lithium battery may be manufactured by first preparing an anode active material composition by mixing anode active materials with a conductive material, a binder and a solvent. An anode plate is then prepared by directly coating the anode active material composition onto copper foil and drying the composition. Alternatively, the anode active material composition is cast on a separate support to form a film which is then released from the support and laminated onto the metal current collector.

The anode active materials can include lithium metal, lithium alloys, carbonaceous materials, oxides of Group 14 and 15 metals, carbon compounds, carbon silicon compounds, silicon oxide compounds, titanium sulfide, boron carbide compounds, carbon metal composites and the like. Suitable carbonaceous materials include artificial graphite, natural graphite, soil graphite, expanding graphite, flake-like graphite and the like. The carbonaceous materials may also include those prepared by thermal decomposition of organic materials under varying pyrolysis conditions.

One nonlimiting example of a suitable conductive material is carbon black.

Nonlimiting examples of suitable binders include vinylidenefluoride/hexafluoropropylene copolymers, polyvinylidenefluoride, polyacrylonitrile, polymethylmethacrylate, polytetrafluoroethylene and mixtures thereof. Styrene butadiene rubber polymers may also be used as the binder.

Nonlimiting examples of suitable solvents include N-methyl-pyrrolidone, acetone, water and the like.

The anode active material, the conductive material, the binder and the solvent are used in amounts commonly used in lithium batteries.

The lithium battery also includes a separator, and any separator commonly used in lithium batteries may be used. The separator should have low resistance to ion movement of the electrolyte and good electrolyte impregnation properties. Nonlimiting examples of suitable materials for use as the separator include glass fibers, polyester, Teflon, polyethylene, polypropylene, polytetrafluoroethylene (PTFE) and mixtures thereof. The separator may comprise woven or nonwoven fabrics. In lithium ion batteries, windable separators made of polyethylene, polypropylene and the like may be used. In lithium ion polymer batteries, separators having good impregnation properties for organic electrolytes may be used. These separators may be prepared as follows.

A polymer resin, a filler and a solvent are mixed to prepare a separator composition. The separator composition is then coated on the top portion of an electrode and dried to form a separator film. Alternatively, the separator composition is cast on a support and dried to form a separator film, which is then peeled from the support and laminated on the electrode.

The polymer resin is not limited and can comprise any material that can be used as a binder for an electrode plate. Nonlimiting examples of suitable polymer resins include vinylidenefluoride/hexafluoropropylene copolymers, polyvinylidenefluoride, polyacrylonitrile, polymethylmethacrylate and mixtures thereof.

The electrolytic solution is prepared by dissolving an electrolyte in a solvent. Nonlimiting examples of suitable solvents include propylene carbonate, ethylene carbonate, diethyl carbonate, ethyl methyl carbonate, methyl propyl carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethylcarbonate, methylethylcarbonate, diethylcarbonate, methylpropylcarbonate, methylisopropylcarbonate, ethylpropylcarbonate, dipropylcarbonate, dibutylcarbonate, diethyleneglycol, dimethylether and mixtures thereof. The electrolyte may include lithium salts, nonlimiting examples of which include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein, x and y are natural numbers), LiCl, LiI and the like.

The separator is positioned between the anode plate and the cathode plate, and the anode plate, cathode plate and separator are wound or folded together to form an electrode assembly. The electrode assembly is then encased in a cylindrical or rectangular battery case, and an organic electrolyte is injected into the battery case to form a lithium ion battery.

The cell structures may be stacked to form a bi-cell structure, which is impregnated with the organic electrolyte solution. The resulting structure is sealed in a pouch to form a lithium ion polymer battery.

The present invention will now be described with reference to the following Examples. The Examples are illustrative in nature and are not intended to limit the scope of the present invention.

EXAMPLES

Preparation of Composite Cathode Active Materials and Cathodes

Example 1

1.4 g of $LiNi_{0.8}Co_{0.1}Mn_{0.1}O_2$ powder having an average particle diameter of 14 μm, 0.6 g of $LiCoO_2$ powder having an average particle diameter of 2 μm, 0.6 g of acetylene black powder as a conductive material having an average particle size of 6 μm and 0.045 g of polyvinylidenefluoride (PVdF) as a binder were mixed and 5 ml of N-methyl-pyrrolidone was added to the mixture. The mixture was stirred with a mechanical stirrer for 30 minutes to form a slurry.

The slurry was then deposited on an aluminum (Al) current collector using a doctor blade to a thickness of about 200 μm and dried. A cathode plate was then prepared by drying the slurry under vacuum at 110° C. The cathode plate was then roll-pressed to form a sheet.

Example 2

A cathode was prepared as in Example 1, except that the $LiNi_{0.8}CO_{0.1}Mn_{0.1}O_2$ powder had an average particle diameter of 14 μm and the $LiCoO_2$ powder had an average particle diameter of 1.3 μm.

Example 3

A cathode was prepared as in Example 1, except that the $LiNi_{0.8}Co_{0.1}Mn_{0.1}O_2$ powder had an average particle diameter of 14 μm and the $LiCoO_2$ powder had an average particle diameter of 0.7 μm.

Example 4

A cathode was prepared as in Example 1, except that the $LiNi_{0.8}CO_{0.1}Mn_{0.1}O_2$ powder had an average particle diameter of 14 μm and the $LiCoO_2$ powder had an average particle diameter of 0.28 μm.

Example 5

A cathode was prepared as in Example 1, except that 1.2 g of the $LiNi_{0.8}Co_{0.1}Mn_{0.1}O_2$ powder having an average particle diameter of 14 μm and 0.8 g of the $LiCoO_2$ powder having an average particle diameter of 2 μm were used.

Example 6

A cathode was prepared as in Example 1, except that 1.4 g of the $LiNi_{0.8}Co_{0.1}Mn_{0.1}O_2$ powder having an average particle diameter of 14 μm and 0.5 g of the $LiCoO_2$ powder having an average particle diameter of 2 μm were used.

Example 7

A cathode was prepared as in Example 1, except that 1.8 g of the $LiNi_{0.8}Co_{0.1}Mn_{0.1}O_2$ powder having an average particle diameter of 14 μm and 0.2 g of the $LiCoO_2$ powder having an average particle diameter of 2 μm were used.

Example 8

A cathode was prepared as in Example 1, except that 1.6 g of $LiCoO_2$ powder having an average particle diameter of 12 μm and 0.4 g of $LiNi_{1/3}Co_{1/3}Mn_{1/3}O_2$ powder having an average particle diameter of 1 μm.

Example 9

A cathode was prepared as in Example 1, except that 1.6 g of $LiCoO_2$ powder having an average particle diameter of 12 μm and 0.4 g of $LiMn_2O_4$ powder having an average particle diameter of 1 μm were used.

Example 10

A cathode was prepared as in Example 1, except that 1.4 g of $LiCoO_2$ powder having an average particle diameter of 12 μm and 0.6 g of $LiNi_{1/3}Co_{1/3}Mn_{1/3}O_2$ powder having an average particle diameter of 1 μm were used.

Example 11

A cathode was prepared as in Example 1, except that 1.4 g of $LiCoO_2$ powder having an average particle diameter of 14 μm and 0.6 g of $LiNi_{0.5}Mn_{0.5}O_2$ powder having an average particle diameter of 1 μm were used.

Example 12

A cathode was prepared as in Example 1, except that 1 g of $LiNi_{0.8}Co_{0.1}Mn_{0.1}O_2$ powder having an average particle diameter of 7 μm and 1 g of graphite powder having an average particle diameter of 1 μm were used.

Example 13

A cathode was prepared as in Example 1, except that 1 g of $LiNi_{0.8}Co_{0.1}Mn_{0.1}O_2$ powder having an average particle diameter of 6 μm and 1 g of graphite powder having an average particle diameter of 1 μm were used.

Example 14

A cathode was prepared as in Example 1, except that 1 g of $LiNi_{0.8}Co_{0.1}Mn_{0.1}O_2$ powder having an average particle diameter of 7 μm and 1 g of graphite powder having an average particle diameter of 0.4 μm were used.

Comparative Example 1

A cathode was prepared as in Example 1, except that the $LiNi_{0.8}CO_{0.1}Mn_{0.1}O_2$ powder had an average particle diameter of 14 μm and the $LiCoO_2$ powder had an average particle diameter of 10 μm.

Comparative Example 2

A cathode was prepared as in Example 1, except that 1.0 g of $LiNi_{0.8}Co_{0.1}Mn_{0.1}O_2$ powder having an average particle diameter of 14 μm and 1 g of $LiCoO_2$ powder having an average particle diameter of 2 μm were used.

Comparative Example 3

A cathode was prepared as in Example 1, except that 2 g of $LiNi_{0.8}CO_{0.1}Mn_{0.1}O_2$ powder having an average particle diameter of 14 μm was used and $LiCoO_2$ powder was not used.

Comparative Example 4

A cathode was prepared as in Example 8, except that 2 g of $LiCoO_2$ powder having an average particle diameter of 12 μm was used and $LiNi_{1/3}Co_{1/3}Mn_{1/3}O_2$ powder was not used.

Comparative Example 5

A cathode was prepared as in Example 12, except that 2 g of $LiNi_{0.8}Co_{0.1}Mn_{0.1}O_2$ powder having an average particle diameter of 7 μm was used and graphite powder was not used.

Experiment 1: Measurement of Electrode Density

The electrode densities of the cathodes produced according to Examples 1 through 14 and Comparative Examples 1 through 5 were measured. The results are shown in Table 1 below.

TABLE 1

| Example | Density (g/cm$^3$) |
| --- | --- |
| Example 1 | 3.55 |
| Example 2 | 3.57 |
| Example 3 | 3.59 |
| Example 4 | 3.60 |
| Example 5 | 3.53 |
| Example 6 | 3.55 |
| Example 7 | 3.52 |
| Example 8 | 3.68 |
| Example 9 | 3.65 |
| Example 10 | 3.7 |
| Example 11 | 3.64 |
| Example 12 | 3.25 |
| Example 13 | 3.22 |
| Example 14 | 3.27 |
| Comparative Example 1 | 3.32 |
| Comparative Example 2 | 3.39 |
| Comparative Example 3 | 3.29 |
| Comparative Example 4 | 3.47 |
| Comparative Example 5 | 3.30 |

As shown in Table 1, Examples 1 through 11 having ratios of the average particle diameter of the large diameter material to the average particle diameter of the small diameter material ranging from 6:1 to 100:1 and a weight ratio of the particles ranging from 60:40 to 90:10 exhibit improved electrode densities relative to Comparative Examples 1 through 4 having ratios of average particle diameters and weight ratios outside those ranges. However, Examples 12 through 14, which use graphite, are compared with Comparative Example 5.

Preparation of Lithium Batteries 2000 mAh 18650 cylindrical lithium batteries were manufactured using the cathode plates prepared with the cathode active materials according to Examples 8 through 14 and Comparative Examples 4 and 5. Each lithium battery also included a graphite anode, a polyethylene separator and an electrolytic solution comprising 1 M $LiPF_6$ is dissolved in a 3:7 mixed EC (ethylene carbonate)+DEC (diethyl carbonate) solvent.

Experiment 2: Measurement of Discharge Capacity

The lithium batteries manufactured using the cathode plates prepared with the cathode active materials according to Examples 8 through 14 and Comparative Examples 4 and 5 were charged under a charging current of 70 mA per 1 g of active material and under a charging current of 1000 mA until the cell voltage against a Li electrode reached 4.2V, 4.3V and 4.5V. After resting the charged lithium batteries for 30 minutes, the lithium batteries were discharged under a constant current of 70 mA per 1 g of active material until the battery reached 3.0V, and the discharging capacity per g of active material was measured. The results are shown in Table 2 below.

TABLE 2

|  | Discharge capacity after charging to 4.2 V (mAh/g) | Discharge capacity after charging to 4.3 V (mAh/g) | Discharge capacity after charging to 4.5 V (mAh/g) |
| --- | --- | --- | --- |
| Example 8 | 143 | 158 | 187 |
| Example 9 | 139 | 156 | 183 |
| Example 10 | 144 | 159 | 191 |
| Example 11 | 138 | 155 | 182 |
| Comparative example 4 | 145 | 159 | 179 |

Examples 8 through 11 use $LiNi_{1/3}Co_{1/3}Mn_{1/3}O_2$ powder, which is a highly stable material. As shown in Table 2, when the lithium batteries having the cathodes of Examples 8 through 11 to 4.2V, a discharge capacity of only about 140 mAh/g was achieved. However, when charging the batteries to 4.3V and 4.5V, stable discharge capacities of about 160 mAh/g and about 190 mAh/g, respectively were achieved.

On the contrary, when charging the lithium battery having the cathode of Comparative Example 4 to 4.3V and 4.5V, irreversible capacity increased.

Experiment 3: Measurement of Thermal Stability

Figure 3:
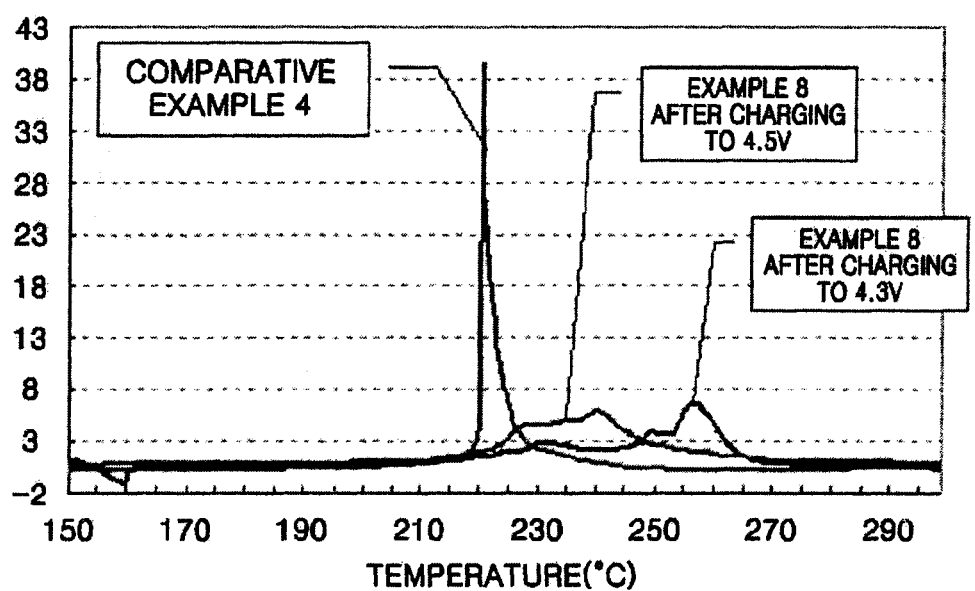
FIG. 3 is a graph of results obtained from a Differential Scanning Calorimeter for cathodes prepared according to Example 8 and Comparative Example 4.

After completing initial charge capacity testing, the lithium batteries having the cathodes of Examples 8 through 11 and Comparative Example 4 were disassembled. The charged cathode sheet was removed from each disassembled battery, and the sheet was washed and then sealed with an electrolyte in an aluminum capsule. The capsule was heated in a differential scanning calorimeter (DSC) at a rate of 5° C./min to determine the initial smoldering temperature and the heating value. The results from the DSC are shown in FIG. 3 and the initial smoldering temperatures of the batteries having the cathodes of Examples 8 through 11 and Comparative Example 4 are shown in Table 3 below.

TABLE 3

|  | Initial smoldering temperature after charging to 4.3 V (° C.) | Initial smoldering temperature after charging to 4.5 V (° C.) |
| --- | --- | --- |
| Example 8 | 241 | 221 |
| Example 9 | 233 | 218 |
| Example 10 | 244 | 225 |
| Example 11 | 231 | 218 |
| Comparative example 4 | 220 | 195 |

As shown in the Table 3, in the batteries having the cathodes of Examples 8 through 11, the initial smoldering temperature after charging the battery to 4.3V was between 230 and 245° C., and the initial smoldering temperature after charging the battery to 4.5 V was between 218 and 225° C. On the contrary, in the battery having the cathode of Comparative Example 4, the initial smoldering temperatures were 220° C. and 195° C., which are lower than those of Examples 8 through 11. Also, as shown in Table 3, in the battery having the cathode of Example 8, the heating value was lower than that of the battery having the cathode of Comparative Example 4. This is believed to be why the $LiNi_{1/3}Co_{1/3}Mn_{1/3}O_2$ powder, which is a highly stable material, maintains its stable chemical state even at high voltage, thereby inhibiting exothermic reactions.

Experiment 4: Measurement of High Rate Discharge Capacity

The lithium batteries having the cathodes of Examples 12 through 14 and Comparative Example 5 were charged at a constant current of 1000 mA until the batteries reached 4.2V relative to a graphite electrode. After resting the charged lithium batteries for 30 min, the lithium batteries were discharged under a constant current of 1 C to 10 C to determine high rate discharge capacity. The results are shown in Table 4 below.

TABLE 4

|  | Discharge capacities at 1 C (mAh) | Discharge capacities at 2 C (mAh) | Discharge capacities at 5 C (mAh) | Discharge capacities at 10 C (mAh) |
| --- | --- | --- | --- | --- |
| Example 12 | 2010 | 1980 | 1860 | 1703 |
| Example 13 | 2011 | 1983 | 1866 | 1713 |
| Example 14 | 2013 | 1986 | 1869 | 1729 |
| Comparative example 5 | 2013 | 1950 | 1804 | 1618 |

As shown in table 4, in the batteries having the cathodes of Examples 12 through 14, discharge capacities decreased as current increased. However, even when discharged at 10 C, the reduction in discharge capacity was less than 15% of the discharge capacity at 1 C. In contrast, in the battery having the cathode of Comparative Example 5, the reduction in discharge capacity was approximately 20%. It is believed that since the batteries having the cathodes of Examples 12 through 14 used graphite powders having small diameters, the movement of electrons was facilitated in spite of the application of plenty of current. Since the battery having the cathode of Comparative Example 5 did not use such highly conductive materials, the movement of electrons was not facilitated.

The composite cathode active materials according to the present invention comprise large diameter cathode active materials and small diameter cathode active materials. Providing large and small diameter materials having an appropriate particle diameter ratio and mixing the large and small diameter materials in the appropriate weight ratio improves packing density. Including highly stable materials and highly conductive materials in the composite cathode active material also improves volume density, discharge capacity and high rate discharge capacity.

While the present invention has been described with reference to certain exemplary embodiments, it will be understood by those of ordinary skill in the art that various modifications may be made to those embodiments without departing from the spirit and scope of the present invention as defined by the following claims.

What is claimed is:

1. A composite cathode active material comprising:
   at least one large diameter active material selected from the group consisting of compounds represented by Formula 1 and compounds represented by Formula 2; and
   at least one small diameter active material selected from the group consisting of compounds represented by Formula 2, compounds represented by Formula 3, and compounds represented by Formula 4;
   wherein a ratio of an average particle diameter of the large diameter active material to an average particle diameter of the small diameter active material ranges from about 6:1 to about 100:1, and wherein a pressed density of the composite cathode active material is about 3.2 to about 4.0 g/cm³;

$$Li_xCo_{1-y}M_yO_{2-\alpha}X_\alpha \qquad \text{Formula 1}$$

$$Li_xCo_{1-y-z}Ni_yM_zO_{2-\alpha}X_\alpha \qquad \text{Formula 2}$$

$$Li_xMn_{2-y}M_yO_{4-\alpha}X_\alpha \qquad \text{Formula 3}$$

$$Li_xCo_{2-y}M_yO_{4-\alpha}X_\alpha \qquad \text{Formula 4}$$

wherein $0.90 \leq x \leq 1.1$, $0.8 \leq y \leq 0.9$, $0 \leq z \leq 0.5$, $0 \leq \alpha \leq 2$, M is selected from the group consisting of Al, Ni, Mn, Cr, Fe, Mg, Sr, V, rare earth elements and mixtures thereof, and X is selected from the group consisting of O, F, S and P,
   wherein one of the at least one large diameter active materials is different from at least one of the at least one small diameter materials, and
   wherein a weight ratio of the at least one large diameter active material to the at least one small diameter active material ranges from about 70:30 to about 80:20.

2. The composite cathode active material according to claim 1, wherein the at least one large diameter active material is selected from the group consisting of $LiNi_{0.8}Co_{0.1}Mn_{0.1}O_2$, $LiNiO_2$, $LiNi_{0.9}CO_{0.1}O_2$, $LiNi_{0.8}Co_{0.1}Al_{0.1}O_2$, and mixtures thereof.

3. The composite cathode active material according to claim 1, wherein the at least one small diameter active material is selected from the group consisting of $LiNi_{1/3}Co_{1/3}Mn_{1/3}O_2$, $LiMn_2O_4$, $LiNi_{0.5}Mn_{0.5}O_2$, $LiCo_{0.95}Mg_{0.05}O_2$, and $LiNi_{1/2}Mn_{3/2}O_4$, and mixtures thereof.

4. The composite cathode active material according to claim 1, wherein the ratio of the average particle diameter of the large diameter active material to the average particle diameter of the small diameter active material ranges from about 6:1 to about 20:1.

5. The composite cathode active material according to claim 1, wherein a mole ratio of the large diameter active material to the small diameter active material ranges from about $60/M_{w1}:40/M_{w2}$ to about $90/M_{w1}:10/M_{w2}$, wherein:
   $M_{w1}$ is a molecular weight of the large diameter active material,
   $M_{w2}$ is a molecular weight of the small diameter active material, and
   each of w1 and w2 is an integer other than 0.

6. The composite cathode active material according to claim 1, wherein a mole ratio of the large diameter active material to the small diameter active material ranges from about $70/M_{w1}:30/M_{w2}$ to about $80/M_{w1}:20/M_{w2}$, wherein:
   $M_{w1}$ is a molecular weight of the large diameter active material,
   $M_{w2}$ is a molecular weight of the small diameter active material, and
   each of w1 and w2 is an integer other than 0.

7. The composite cathode active material according to claim 1, wherein a pressed density of the large diameter active material ranges from about 2.5 to about 4.0 g/cm³ and a pressed density of the small diameter active material ranges from about 1.0 to about 4.0 g/cm³.

8. The composite cathode active material according to claim 1, wherein the average particle diameter of the large diameter active material ranges from about 1 to about 25 μm.

9. The composite cathode active material according to claim 1, wherein the average particle diameter of the small diameter active material ranges from about 0.05 to about 5 μm.

10. A cathode comprising the composite cathode active material of claim 1.

11. A lithium battery comprising the cathode of claim 10.

* * * * *

UNITED STATES PATENT AND TRADEMARK OFFICE
CERTIFICATE OF CORRECTION

PATENT NO.        : 8,663,846 B2                                   Page 1 of 1
APPLICATION NO.   : 12/568510
DATED             : March 4, 2014
INVENTOR(S)       : Young-Min Choi et al.

It is certified that error appears in the above-identified patent and that said Letters Patent is hereby corrected as shown below:

In the Claims

Col. 14, line 1, Claim 2    Delete "$LiNi_{0.9}CO_{0.1}O_2$",
                            Insert -- $LiNi_{0.9}Co_{0.1}O_2$ --

Signed and Sealed this
Second Day of August, 2016

Michelle K. Lee
*Director of the United States Patent and Trademark Office*